United States Patent
Kumar et al.

(10) Patent No.: US 10,188,093 B2
(45) Date of Patent: Jan. 29, 2019

(54) ACTIVE ELECTROSTATIC WILDLIFE GUARD FOR ELECTRICAL POWER DISTRIBUTION EQUIPMENT

(71) Applicant: Tyco Electronics Corporation, Berwyn, PA (US)

(72) Inventors: Senthil A. Kumar, Morrisville, NC (US); Laura Jackson Hiller, Cary, NC (US); David Edwin Bowling, Fuquay-Varina, NC (US); Luis Puigcerver, Cary, NC (US); Stephen M. Parker, Greensboro, NC (US); Ramdas M. Pai, Holly Springs, NC (US); Denton Jackson, Coldwater, MS (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 15/064,883

(22) Filed: Mar. 9, 2016

(65) Prior Publication Data

US 2016/0262373 A1   Sep. 15, 2016

Related U.S. Application Data

(60) Provisional application No. 62/131,428, filed on Mar. 11, 2015.

(51) Int. Cl.
*A01K 3/00* (2006.01)
*H01B 17/56* (2006.01)
*A01M 29/24* (2011.01)

(52) U.S. Cl.
CPC .............. *A01M 29/24* (2013.01); *A01K 3/005* (2013.01)

(58) Field of Classification Search
None
See application file for complete search history.

(56) References Cited

U.S. PATENT DOCUMENTS

| | | |
|---|---|---|
| 5,191,857 A | 3/1993 | Boaz |
| 5,299,528 A | 4/1994 | Blankenship |
| 5,392,732 A | 2/1995 | Fry |
| 5,648,641 A | 7/1997 | Guthrie |
| 5,682,015 A * | 10/1997 | Harben ................ H01B 17/00 174/138 R |
| 5,864,096 A | 1/1999 | Williams et al. |
| 5,992,828 A | 11/1999 | Burdick |

(Continued)

*Primary Examiner* — Dimary S Lopez Cruz
(74) *Attorney, Agent, or Firm* — Myers Bigel, P.A.

(57) ABSTRACT

Provided is an apparatus for wildlife deterrence on a high voltage conductor. The apparatus includes an electrical insulator including an electrically insulating material without a conductive material. The electrical insulator includes a first surface, a second surface that is opposite the first surface, a first edge that is between the first surface and the second surface, an intersection between the first edge and the first and second surfaces defining outer edges of the first and second surfaces, respectively, and a second edge that is opposite the first edge and that is between the first surface and the second surface, an intersection between the second edge and the first and second surfaces defining interior edges of the first and second surfaces, respectively. The apparatus further includes an electrical conductor that is arranged on the first surface of the electrical insulator and is spaced apart from the second edge.

19 Claims, 6 Drawing Sheets

(56) References Cited

U.S. PATENT DOCUMENTS

| | | | |
|---|---|---|---|
| 6,125,595 A | 10/2000 | Showalter | |
| 6,248,956 B1 * | 6/2001 | Cook | H02G 7/00 |
| | | | 174/154 |
| 6,453,775 B1 | 9/2002 | Dietrich et al. | |
| 6,571,517 B2 * | 6/2003 | Wulff | A01G 13/10 |
| | | | 119/514 |
| 6,817,138 B1 | 11/2004 | McGill et al. | |
| 6,878,883 B1 * | 4/2005 | Rauckman | H01B 17/00 |
| | | | 174/135 |
| 6,925,748 B2 | 8/2005 | McGill et al. | |
| 6,948,452 B2 | 9/2005 | Wolfgram | |
| 7,191,735 B2 | 3/2007 | Wolfgram | |
| 7,481,021 B2 * | 1/2009 | Riddell | A01M 29/26 |
| | | | 43/1 |
| 7,679,000 B2 * | 3/2010 | Rauckman | H01B 17/00 |
| | | | 174/135 |
| 8,196,340 B2 | 6/2012 | Donoho | |
| 8,293,044 B1 | 10/2012 | Riddell | |
| 8,424,238 B2 | 4/2013 | Donoho | |
| 8,430,063 B1 | 4/2013 | Riddell | |
| 8,434,209 B1 | 5/2013 | Riddell | |
| 2007/0131447 A1 | 6/2007 | Rauckman | |
| 2008/0066948 A1 | 3/2008 | Rauckman | |
| 2013/0220695 A1 | 8/2013 | Hiller et al. | |

\* cited by examiner

US 10,188,093 B2

ACTIVE ELECTROSTATIC WILDLIFE GUARD FOR ELECTRICAL POWER DISTRIBUTION EQUIPMENT

RELATED APPLICATIONS

The present patent application claims priority to U.S. Provisional Application No. 62/131,428, filed Mar. 11, 2015 and entitled Active Electrostatic Wildlife Guard For Electrical Power Distribution Equipment, the disclosure of which is hereby incorporated herein by reference as if set forth fully herein.

BACKGROUND

Distribution and substation equipment used to supply electrical power have used wildlife protection to prevent wildlife from simultaneously contacting energized and grounded surfaces and/or adjacent phases. When such contact occurs, short circuits and consequent power outages frequently may be the result. The wildlife protection may be typically applied to an equipment bushing or lightning arrester of the distribution or substation equipment. For adequate protection, a number of presently available wildlife guards have also required an insulated or covered wire between the bushing and arrester.

Available wildlife guards have posed problems because they only attempt to deter the animal fm simultaneously touching a grounded surface and an energized surface. Such guards do nothing to prevent an animal from climbing on the equipment entirely. As a result, because the animal is not deterred from staying away from the equipment entirely, the animal may still find a way to simultaneously touch energized and grounded surfaces. Additionally, the animals, particularly squirrels, have a tendency to chew on prior art wildlife guards. As such, effective wildlife guards are desired.

SUMMARY

Some embodiments of the present invention are directed to an apparatus for wildlife deterrence on a high voltage conductor. The apparatus includes an electrical insulator including an electrically insulating material without a conductive material. The electrical insulator includes a first surface, a second surface that is opposite the first surface, a first edge that is between the first surface and the second surface, an intersection between the first edge and the first and second surfaces defining outer edges of the first and second surfaces, respectively, and a second edge that is opposite the first edge and that is between the first surface and the second surface, an intersection between the second edge and the first and second surfaces defining interior edges of the first and second surfaces, respectively. The apparatus includes an electrical conductor that is arranged on the first surface of the electrical insulator and is spaced apart from the second edge.

In some embodiments, the interior edges of the electrical insulator define a central opening that is configured to receive the high voltage conductor.

Some embodiments provide that the first surface of the electrical insulator is substantially planar. In some embodiments, the first surface of the electrical insulator is substantially non-planar.

In some embodiments, the first edge defines a first shape that includes a circular and/or polygonal shape.

Some embodiments provide that the first edge defines a first shape and that the electrical conductor that is arranged on the first surface of the electrical insulator includes a second shape that is the same as the first shape.

Some embodiments include a clamping component that is attached to the electrical insulator proximate the interior edges of the first and second surfaces and that engages the high voltage conductor to maintain a position of the electrical insulator relative to the high voltage conductor.

In some embodiments, the electrical insulator further includes a third edge that is between a proximal end of the first edge and a proximal end of the second edge and that is between the first surface and the second surface and a fourth edge that is between a distal end of the first edge and a distal end of the second edge and that is between the first surface and the second surface. In some embodiments, a gap is formed between the third edge and the fourth edge and the gap is in fluidic communication with a central opening that is defined by the interior edges of the electrical insulator. Some embodiments provide that the third edge overlaps the first surface and the second edge overlaps the second surface and that the first surface is proximate the second surface in a portion between where the third edge overlaps the first surface and the second edge overlaps the second surface.

In some embodiments, the electrical conductor is on the first edge. Some embodiments provide that the electrical conductor includes a metal strip that is attached to the first side of the electrical insulator. Some embodiments provide that the electrical conductor comprises a conductive plastic material. In some embodiments, the electrical conductor comprises a multiple strand electrical conductor. Some embodiments provide that the electrical conductor is a conductive coating that is applied to the first surface of the electrical insulator. In some embodiments, the electrical conductor includes a plurality of electrical conductors that are spaced apart at different respective distances from the second edge.

Some embodiments provide that the electrical insulator includes a first insulator structure that includes the first surface and the second surface, a second insulator structure that includes the first surface and the second surface and an insulator coupler that is configured to attach the first insulator structure to the second insulator structure. Some embodiments provide that the high-voltage electrical conductor is between the first insulator structure and the second insulator structure when the apparatus is installed thereon.

Further features, advantages and details of the present invention will be appreciated by those of ordinary skill in the art from a reading of the figures and the detailed description of the embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF DRAWINGS

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION

Figure 1:
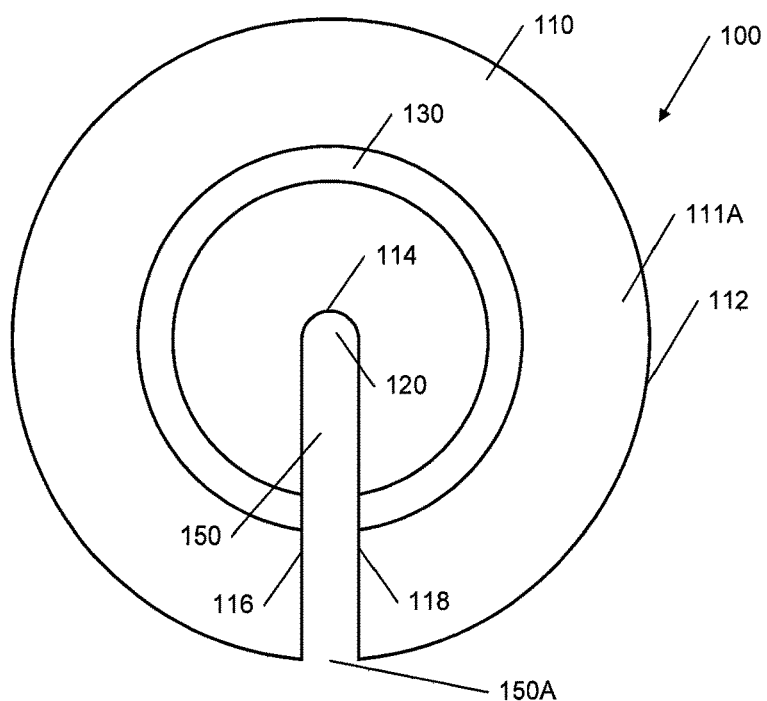
FIG. 1 is front schematic view of an active electrostatic wildlife guard according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. The present invention will now be described more fully hereinafter with reference to the accompanying drawings, in which some embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

It should be construed that forgoing general illustrations and following detailed descriptions are exemplified and an additional explanation of claimed inventions is provided.

Reference numerals are indicated in detail in some embodiments of the present invention, and their examples are represented in reference drawings. Throughout the drawings, like reference numerals are used for referring to the same or similar elements in the description and drawings.

Figure 2A:
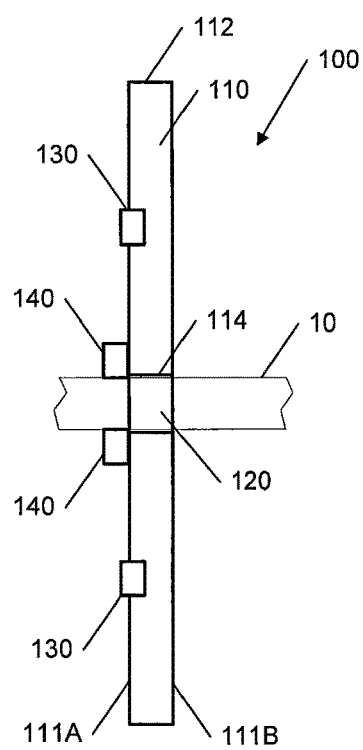
FIGS. 2A and 2B are each cross-sectional side views of the active electrostatic wildlife guard of FIG. 1 according to two different respective embodiments of the present invention.
Figure 2B:
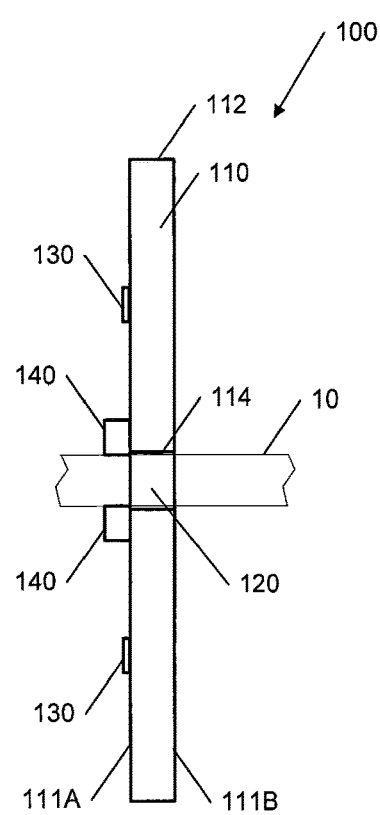

Reference is now made to FIG. 1, which is front schematic view of an active electrostatic wildlife guard according to some embodiments of the present invention, and to FIGS. 2A and 2B, which are each cross-sectional side views of the active electrostatic wildlife guard of FIG. 1 according to two different respective embodiments of the present invention.

An active electrostatic wildlife guard ("guard") 100 may prevent and/or reduce the incursion of wildlife such, as for example, squirrels, into electrical equipment via high voltage power lines connected to the electrical equipment. Some embodiments of the guard 100 include an electrical insulator 110 that is formed of an electrically insulating material. In some embodiments, the electrical insulator 110 may be substantially without electrically conductive materials embedded within the electrically insulating material.

Some embodiments provide that the electrical insulator 110 may be substantially planar and may include a first side 111A and a second side 111B that is substantially opposite the first side 111A. In some embodiments, the electrical insulator 110 includes a first edge 112 that is between the first and second surfaces 111A, 111B and the defines outer edges thereof Although the electrical insulator 110 is illustrated as being substantially circular in shape, the invention is not so limited. For example, the electrical insulator 110 may include a polygonal, elliptical, curvilinear and/or circular shape that maybe symmetrical and/or asymmetrical about one or more axes.

In some embodiments, the electrical insulator 110 may include a second edge 114 that is opposite the first edge 112 and/or a portion thereof. Some embodiments provide that the second edge 114 defined and/or partially defines interior edges of the first and second surfaces 111A, 111B that may define a central opening 120 this configured to receive a high-voltage conductor 10.

In some embodiments, the electrical insulator 110 may include a third edge 116 between the first and second surfaces 111A, 111B and a fourth edge 118 that is between the first and second services 111A, 111B. The third edge 116 and the fourth edge 118 may define a gap 150 in the electrical insulator 110 that extends from the central opening 120 to the first edge 112, which may be the outer edge. In some embodiments, the gap 150 defines a conductor-receiving channel and/or slot extending radially from an entrance opening 150A at the first edge 112 to a central conductor seat that may be in the central opening 120. In this manner, the electrical insulator 110 may be in fluidic communication with the central opening 120 such that the high-voltage conductor 10 may be arranged in the central opening 120 via the gap.

The guard 100 may include an electrical conductor 130 that is arranged in the first surface 111A of the electrical insulator 110 and that is spaced apart from the second edge 114. In some embodiments, the electrical conductor 130 may include an electrically conductive material including a metallic material and/or a conductive composite such as an electrically conductive plastic. Some embodiments provide that the electrical conductor 130 may be substantially monolithic in that the composition of the electrical conductor 130 includes the same material throughout. Some embodiments provide that the electrical conductor 130 may be attached to the electrical insulator 110 via one or more mechanical fastening techniques and/or one or more adhesive and/or bonding techniques.

In some embodiments, the electrical conductor 130 may include a conductive sheet, foil, textile, fabric and/or other electrically conductive structures. In some embodiments, the electrical conductor 130 may be a conductive composition that may be applied to the electrical insulator 110 using a spraying, rolling, printing, making, dipping and/or other material deposition and/or coating techniques. Some embodiments provide that the electrical conductor 130 includes a multiple strand electrical conductor such as a conductive braid and/or stranded conductor.

As illustrated in FIG. 2A, the electrical conductor 130 may be positioned in one or more recesses, cavities and/or channels formed in the electrical insulator 110. According to some embodiments, as illustrated in FIG. 2B, the electrical conductor 130 may be positioned on the first surface 111A of the electrical insulator 110 in the absence of recesses, cavities and/or channels therein.

As provided above, some embodiments of the electrical insulator 110 may include shapes other than the circular shapes illustrated herein. In some embodiments, the electrical conductor 130 may be arranged on the first surface 111A of the electrical insulator 110 in a geometric shape corresponding to the shape of the electrical insulator 110. In some embodiments, the electrical conductor 130 may be substantially annular and may be substantially centered about the high-voltage conductor 10 when installed thereon. Some embodiments provide that the arrangement of the electrical conductor 130 is different from the geometric shape of the electrical conductor 110.

In some embodiments, the electrical conductor 130 may be one or more elongated, thin strips of conductors. Some embodiments provide that the electrical conductor 130 may have a ratio of width to thickness in a range of about 1:1 to about 100:1. In some embodiments, the electrical conductor 130 may include a width in a range of about 0.125 inches to about 2 inches, however, such embodiments are non-limiting. For example, the electrical conductor 130 may have a width that is less than 0.125 inches and/or more than 2 inches within the scope and spirit of this disclosure. Some embodiments provide that the electrical conductor 130 may have a radial spacing from the central opening 120 in a range of about 3 inches to about 14 inches, however, such embodiments are non-limiting. For example, the radial spacing may be less than 3 inches and/or more than 14 inches.

Although not illustrated in FIG. 1, FIGS. 2A and 2B illustrate that the guard 100 may including a clamping component 140 that may be attached to the electrical insulator 110 and that is configured to engage the high-voltage conductor 10 to maintain a position of the guard 100 relative to the high-voltage conductor 10. In some embodiments, the clamping component 140 may include a releasable clamp that is configured to be manipulated using conventional high-voltage tools such as, for example, an elongated insulated tool that may be referred to as a "hot stick". In this manner, the guard 100 may be installed on and/or removed from high-voltage conductors 10, while energized.

Some embodiments provide that the guard 100 may be secured to the high-voltage conductor 10 using a compression type connector or tap. For example, a compression type connector may include one or more elements that, when compressed, created a secure coupling to the high-voltage conductor 10. In some embodiments, the compression type connector may include multiple elements that are compressed and/or deformed onto a high-voltage conductor 10 using a tool, such, as, for example, a powder actuated tool.

Figure 10:
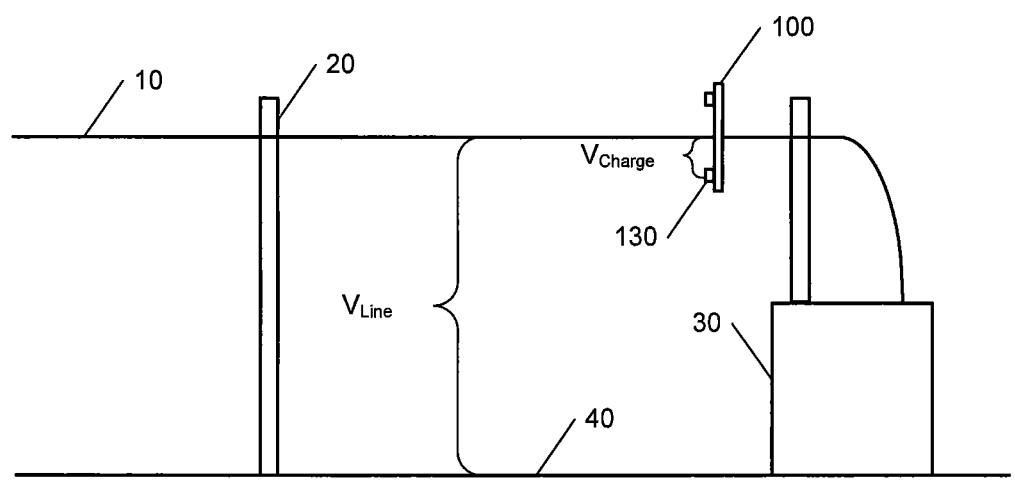
FIG. 10 is an elevation schematic diagram illustrating some embodiments of the present invention in an application in which an active electrostatic wildlife guard may be used.

Reference is now made to FIG. 10, which is an elevation schematic diagram illustrating some embodiments of the present invention in an application in which an active electrostatic wildlife guard may be used. A high-voltage conductor 10 may be supported by multiple support structures 20 the distances significantly above the earth ground 40. As used herein, a high-voltage conductor 10 may include any conductor in a high-voltage conductive path including cables, bus bars, and/or insulator termination points, among others. High-voltage conductors 10 may be terminated at electrical equipment 30, which may include a substation, switchgear, transformer, capacitor bank, and/or distribution terminal, among others. Some embodiments provide that the guard 100 may be installed on the high-voltage conductor 10 at any point beyond which protection from wildlife such as squirrels may be desired. For example, as illustrated, it may be desirable to prevent wildlife from traversing the high-voltage conductor 10 to gain access to the electrical equipment 30. In this regard, the guard 100 may be positioned on the high-voltage conductor 10 proximate the electrical equipment 30.

As used herein, the term "high-voltage" may be used to refer to medium voltage, which is in a range of about 1 kV to about 75 kV, and high voltage, which is in a range of about 75 kV to about 230 kV.

In use and operation, the high-voltage conductor 10 may have significant electrical potential relative to the ground 40 that is illustrated as $V_{Line}$. Some embodiments provide that $V_{Line}$ may include voltages from 1 kV to 500 kV. The electrical conductor 130 of the guard 100 may gain electrostatic charge from the electric field between the ground 40 and the high-voltage conductor 10. Stated differently, electrical conductor 130 may gain electrostatic charge from the capacitance between the high-voltage conductor 10 and the ground 40. As a result, the electrical conductor 130 may have an electrical potential difference of voltage $V_{Charge}$ that is less than $V_{Line}$. When an animal traversing the high-voltage conductor 10 attempts to traverse the guard 100, contact with both the high-voltage conductor 10 and the electrical conductor 130 deliver a small electrical shock corresponding to voltage $V_{Charge}$. Based on the small electrical shock, the animal may be deterred from further climbing on the high-voltage conductor 10. Some embodiments provide that the shock may not be harmful to the animal, but may be significantly annoying to create a conditioned response in the animal that further prevents the animal for climbing on the high-voltage conductor 10 and/or electrical equipment 30. Some embodiments provide that the high-voltage conductor 10 and/or the electrical equipment 30 may be components in an electrical power distribution system.

Figure 3:
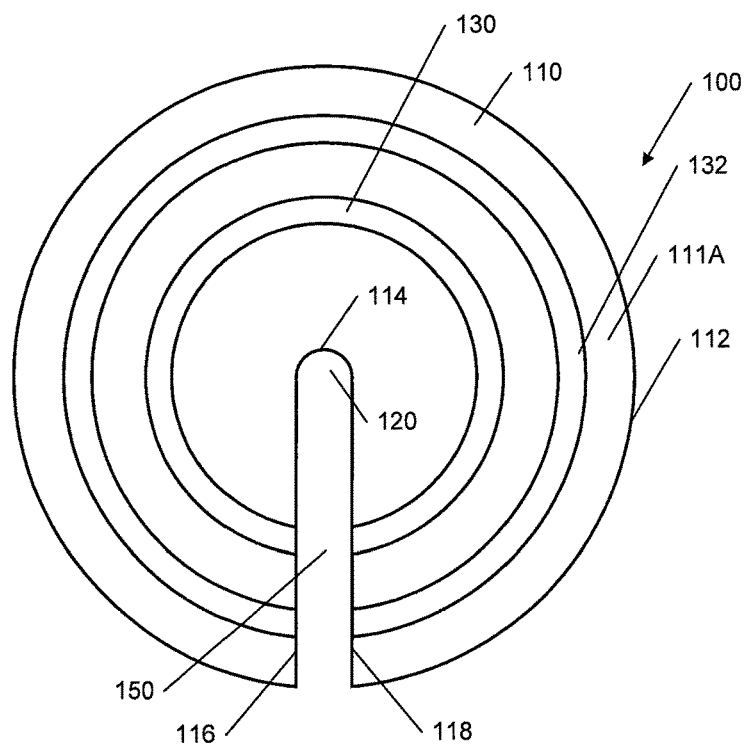
FIG. 3 is front schematic view of an active electrostatic wildlife guard according to some embodiments of the present invention.
Figure 4:
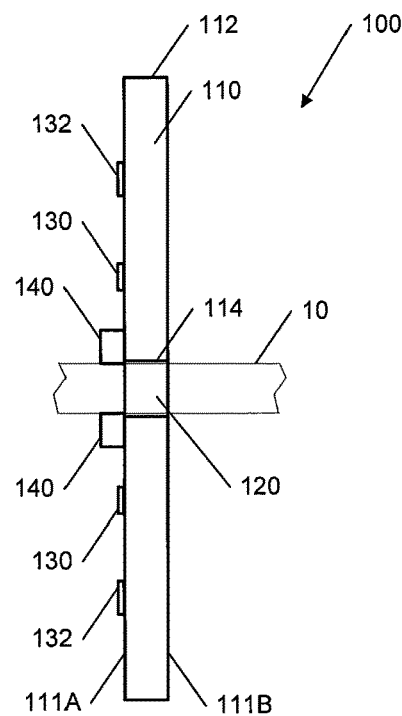
FIG. 4 is a cross-sectional side view of the active electrostatic wildlife guard of FIG. 3 according to some embodiments of the present invention.

In some embodiments, a distance of electrical conductor 130 from a high-voltage conductor 10 may be determined by the operating voltage of the high-voltage conductor 10 and/or by a size range of wildlife that the guard 100 is intended to deter. For example, in the context of a planar, circular-shaped guard 100, a radius of the electrical conductor 130 may be different for different applications and/or environments. Some embodiments of the present invention may address this issue by providing multiple electrical conductors 130 on the electrical insulator 110. For example, reference is now made to FIG. 3, which is front schematic view of an active electrostatic wildlife guard according to some embodiments of the present invention and to FIG. 4, which is a cross-sectional side view of the active electrostatic wildlife guard of FIG. 3 according to some embodiments of the present invention.

As illustrated, the guard 100 may include a first electrical conductor 130 that is spaced at a first radial distance from the central opening 120 and a second electrical conductor 132 that is spaced at a second radial distance from the central opening, such that the second radial distance is further than the first radial distance. For example, some embodiments provide that the first and second conductors may be arranged as substantially concentric rings. The first electrical conductor 130 may develop a first voltage relative to the high-voltage conductor 10 and the second electrical conductor 132 may develop a second voltage relative to the high voltage conductor 10 that is different from the first voltage. In this manner, an animal contacting any two of the high-voltage conductor 10, the first electrical conductor 130 and the second electrical conductor 132 may receive an electrical shock based on the voltage differences therebetween. Although illustrated as two different electrical conductors 130, 132, the invention is not so limited. For example, a guard 100 according to embodiments disclosed herein may include three or more electrical conductors.

Figure 5:
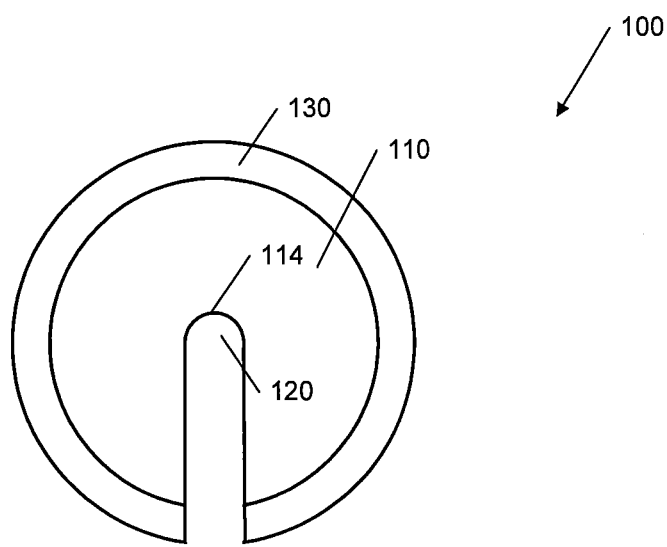
FIG. 5 is front schematic view of an active electrostatic wildlife guard according to some embodiments of the present invention.
Figure 6:
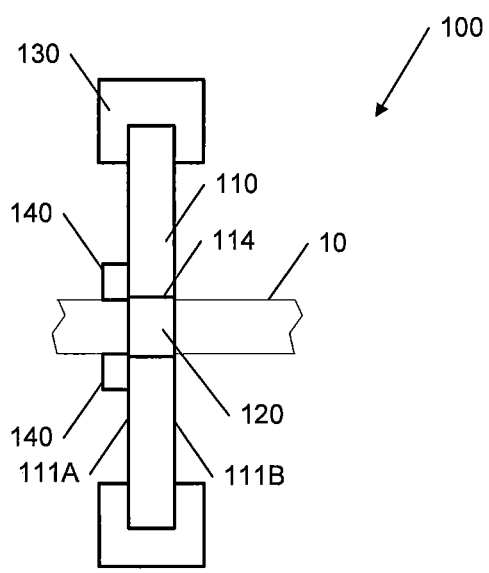
FIG. 6 is a cross-sectional side view of the active electrostatic wildlife guard of FIG. 5 according to some embodiments of the present invention.

Reference is now made to FIG. 5, which is a front schematic view of an active electrostatic wildlife guard according to some embodiments of the present invention and to FIG. 6, which is a cross-sectional side view of the active electrostatic wildlife guard of FIG. 5 according to some embodiments of the present invention. As illustrated, some embodiments provide that a guard may include an electrical conductor 130 that is positioned at the first edge 112. In some embodiments, the electrical conductor 130 may be only on the first surface 111A of the electrical insulator 110. Some embodiments provide that the electrical conductor 130 may be only on the first edge 112 and not on either of the first or second surfaces 111A, 111B. Some embodiments provide that the electrical conductor 130 may be on the first surface 111A, the first edge 112 and the second surface 111B. For example, some embodiments provide that the electrical conductor 130 is a channel that may be formed along the first edge 112. Some embodiment provide that the electrical conductor 130 is a flexible conductive device that may include multiple conductors that may be a fabric and/or woven and/or braided together.

Figure 7:
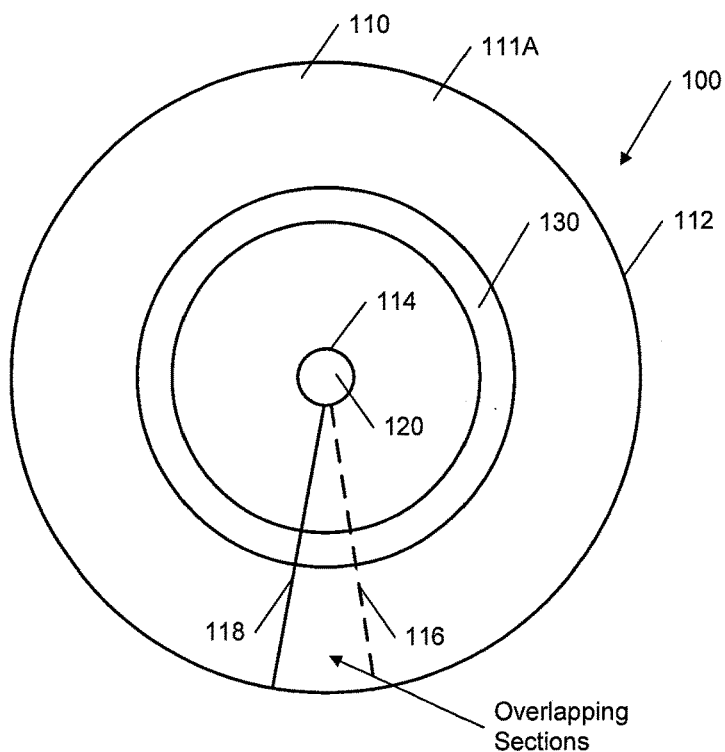
FIG. 7 is front schematic view of an active electrostatic wildlife guard according to some embodiments of the present invention.
Figure 8:
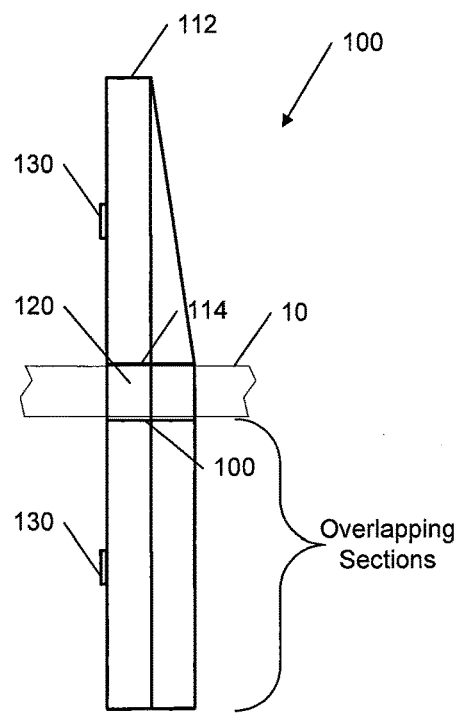
FIG. 8 is a cross-sectional side view of the active electrostatic wildlife guard of FIG. 7 according to some embodiments of the present invention.

Reference is now made to FIG. 7, which is front schematic view of an active electrostatic wildlife guard according to some embodiments of the present invention and to FIG. 8, which is a cross-sectional side view of the active electrostatic wildlife guard of FIG. 7 according to some embodiments of the present invention. In some embodiments, the third edge 116 overlaps the first surface 111B and the fourth edge 118 overlaps the second surface such that between the third and the fourth edges, the first and second surfaces 111A, 111B are facing one another and may be in contact with one another by virtue of the resiliency of the electrical insulator 110. In some embodiments, instead of a clamping component, the overlapping portions of the electrical insulator 110 may be used to retain the guard 100 on the high-voltage conductor 10. Installation of the guard 100 may be accomplished by compelling the high-voltage conductor 10 towards the central opening 120 between the overlapping portions of the electrical insulator 110 with the high-voltage conductor 10 and the gap between the overlapping portions being substantially parallel to one another during installation. Once the high-voltage conductor 10 is proximate the central opening 120, the guard 100 may be rotated to be substantially perpendicular to the high-voltage conductor 10.

Figure 9:
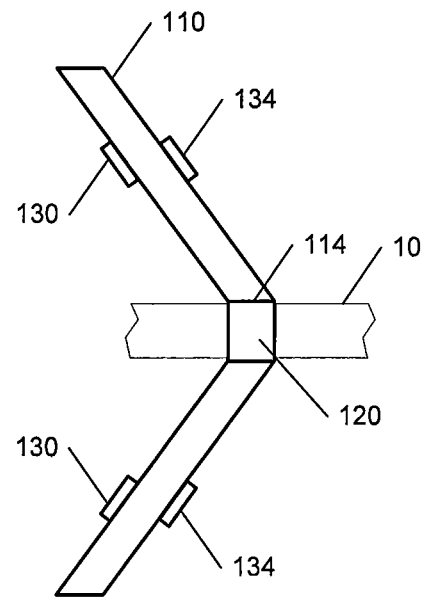
FIG. 9 is a cross-sectional side view of an active electrostatic wildlife guard according to further embodiments of the present invention.

Brief reference is now made to FIG. 9, which is a cross-sectional side view of an active electrostatic wildlife guard according to further embodiments of the present invention. Some embodiments provide that the electrical insulator 110 is substantially non-planar. For example, the electrical insulator 110 may include a conical, curvilinear, hemi-spherical, parabolic, and/or ribbed cross-sectional shape, among others. Some embodiments provide a guard 100 that may include a first electrical conductor 130 on a first surface of the electrical insulator 110 and a second electrical conductor 134 on a second surface of the electrical insulator that is opposite the first surface.

Figure 11A:
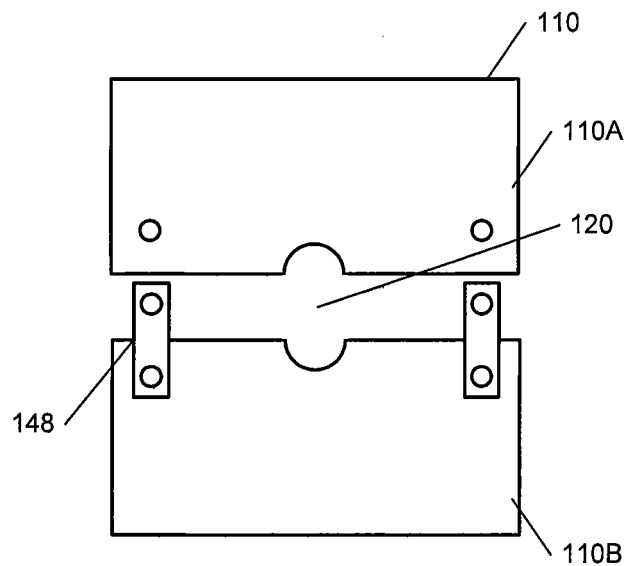
FIGS. 11A and 11B are front schematic views of an electrical insulator that may be used in an electrostatic wildlife guard according to some embodiments of the present invention in unattached and attached configurations, respectively.
Figure 11B:
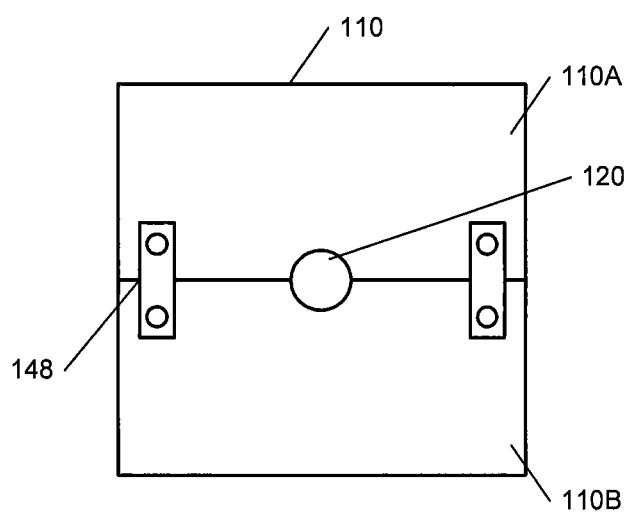

Reference is now made to FIGS. 11A and 11B, which are front schematic views of an electrical insulator 110 that may be used in an electrostatic wildlife guard according to some embodiments of the present invention in unattached and attached configurations, respectively. In some embodiments, an electrical insulator 110 may include a first insulator structure 110A that includes the first surface and the second surface and a second insulator structure 110B that includes the first surface and the second surface. As illustrated in FIG. 11A, the first and second insulator structures 110A, 110B are not coupled to one another. Referring to FIG. 11B, the first and second insulator structures 110A, 110B may be coupled to one another using one or more insulator couplers 148.

In some embodiments, an insulator coupler 148 may include an electrically insulating and/or electrically conductive materials therein. Some embodiments provide that the insulator coupler 148 may include any mechanical means for mechanically attaching the first and second insulator structures 110A, 110B to one another.

When coupled to one another, the first and second insulator structures 110A, 110B may define a central opening 120 that may be configured to receive the high-voltage conductor 10. Although the first electrical insulator 110A is illustrated as having the same shape as the second insulator structure 110B, the inventive concept is not so limiting. For example, the first insulator structure 110A may include a shape that is different from the second insulator structure 110B. For example, the first insulator structure 110A may define a cavity and/or gap that the second insulator structure is configured to substantially fill when coupled to the first insulator structure 110A.

Although the first and second electrical insulators 110A, 110B are illustrated as having a polygonal shape, the inventive concept is not so limiting. For example, the first and/or second insulator structures 110A, 110B may include a generally circular and/or curved shape. Some embodiments provide that the first insulator structure 110A may include a generally circular shape having a generally a pie-shaped gap. In such embodiments, the second insulator structure 110B may include a generally pie-shape that is configured to be substantially complementary to the first insulator structure 110A.

An active electrostatic wildlife guard may include a clamping component to attach to a high-voltage conductor according to some embodiments of the present invention. Note that some embodiments provide that the clamping component is positioned on a second surface of the electrical insulator while the electrical conductor may be arranged on the first surface of the electrical insulator that is opposite the second surface.

An active electrostatic wildlife guard may include a plurality of segments of conductive plastic used as an electrical conductor and attached to an electrical insulator according to some embodiments of the present invention. Note that the electrical conductor on the first surface of the electrical insulator may include a plurality of substantially linear segments of a conductive material that are conductively coupled to one another through contact. Some embodiments provide that the plurality of substantially linear segments may be metallic and/or a conductive plastic, among others.

An active electrostatic wildlife guard may include a braided conductor used as an electrical conductor and attached to an outside edge of an electrical insulator according to some embodiments of the present invention. In some embodiments, the electrical conductor may be a material including multiple conductive elements that may be braided, twisted and/or woven together to form the electrical conductor. In some embodiments, the electrical conductor may be arranged at an outside edge of the electrical insulator.

The foregoing is illustrative of the present invention and is not to be construed as limiting thereof Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the embodiments disclosed herein, and that modifications to the disclosed embodiments, as well as other embodiments, are intended to be included within the scope of the appended claims. The present invention is defined by the following claims.

What is claimed is:

1. An apparatus for wildlife deterrence on a high voltage conductor, the apparatus comprising:
    an electrical insulator including an electrically insulating material without a conductive material, the electrical insulator comprising:
        a first surface;
        a second surface that is opposite the first surface;
        a first edge that is between the first surface and the second surface, the first edge and the first and second surfaces defining outer edges of the first and second surfaces, respectively; and
        a second edge that is opposite the first edge and that is between the first surface and the second surface, the second edge and the first and second surfaces defining interior edges of the first and second surfaces, respectively;
        a third edge that is between a proximal end of the first edge and a proximal end of the second edge and that is between the first surface and the second surface;
        a fourth edge that is between a distal end of the first edge and a distal end of the second edge and that is between the first surface and the second surface;
        a central opening defined in the electrical insulator including through the first and second surfaces; and
        a gap defined by the third edge and the fourth edge that communicates with the central opening;
    an electrical conductor that is arranged on the first surface of the electrical insulator and is spaced apart from each of the first edge and the second edge, wherein the electrical conductor extends continuously from the third edge to the fourth edge.

2. The apparatus according to claim 1, wherein the interior edges of the electrical insulator define the central opening that is configured to receive the high voltage conductor.

3. The apparatus according to claim 1, wherein the first surface of the electrical insulator is substantially planar.

4. The apparatus according to claim 1, wherein the first surface of the electrical insulator is substantially non-planar.

5. The apparatus according to claim 1, wherein the first edge defines a first shape that includes a circular and/or polygonal shape.

6. The apparatus according to claim 1,
    wherein the first edge defines a first shape, and
    wherein the electrical conductor that is arranged on the first surface of the electrical insulator includes a second shape that is the same as the first shape.

7. The apparatus according to claim 1, further comprising a clamping component that is attached to the electrical insulator proximate the interior edges of the first and second surfaces and that engages the high voltage conductor to maintain a position of the electrical insulator relative to the high voltage conductor.

8. The apparatus according to claim 1,
    wherein the third edge is configured to overlap the first surface and the second edge is configured to overlap the second surface, and
    wherein the first surface is proximate the second surface in a portion between where the third edge overlaps the first surface and the second edge overlaps the second surface.

9. The apparatus according to claim 1, wherein the electrical conductor is on the first edge.

10. The apparatus according to claim 1, wherein the electrical conductor comprises a metal strip that is attached to the first side of the electrical insulator.

11. The apparatus according to claim 1, wherein the electrical conductor comprises a conductive plastic material.

12. The apparatus according to claim 1, wherein the electrical conductor comprises a multiple strand electrical conductor.

13. The apparatus according to claim 1, wherein the electrical conductor is a conductive coating that is applied to the first surface of the electrical insulator.

14. The apparatus according to claim 1, wherein the electrical conductor comprises a plurality of electrical conductors that are spaced apart at different respective distances from the second edge.

15. The apparatus according to claim 1, wherein the electrical insulator comprises:
- a first insulator structure that includes the first surface and the second surface;
- a second insulator structure that includes the first surface and the second surface; and
- an insulator coupler that is configured to attach the first insulator structure to the second insulator structure,
- wherein the high voltage conductor is between the first insulator structure and the second insulator structure when the apparatus is installed thereon.

16. The apparatus according to claim 1, wherein:
- the first surface of the electrical insulator defines a continuous surface between the second edge, the third edge, the fourth edge, and the electrical conductor; and
- the first surface of the electrical insulator defines a continuous surface between the first edge, the third edge, the fourth edge, and the electrical conductor.

17. An apparatus for wildlife deterrence on a high voltage conductor, the apparatus comprising:
- an electrical insulator including an electrically insulating material without a conductive material, the electrical insulator comprising:
  - a planar first surface;
  - a planar second surface that is opposite the first surface;
  - an outer edge that is between the first surface and the second surface;
  - a central opening defined in the electrical insulator including through the first and second surfaces, the central opening configured to receive the high voltage conductor therein; and
- an electrical conductor arranged along the outer edge of the electrical insulator;
- wherein a further electrical conductor is not arranged on either the first surface or the second surface of the electrical insulator;
- wherein a distance on the first surface or the second surface between the central opening and the outer edge is greater than a width of the outer edge.

18. An apparatus for wildlife deterrence on a high voltage conductor that is in a substantially horizontal orientation, the apparatus comprising:
- an electrical insulator including an electrically insulating material, the electrical insulator comprising:
  - a planar first surface;
  - a planar second surface that is opposite the first surface;
  - an outer edge that is between the first surface and the second surface; and
  - a central opening defined in the electrical insulator including through the first and second surfaces;
- an electrical conductor arranged on the first surface of the electrical insulator;
- wherein the apparatus is configured to be installed in an installed position on the high voltage conductor with the high voltage conductor received in the central opening and with the electrical insulator including the first and second surfaces in a substantially vertical orientation;
- wherein a distance on the first surface or the second surface between the central opening and the outer edge is greater than a width of the outer edge.

19. The apparatus according to claim 18, wherein:
- the electrical insulator includes a conductor receiving channel extending from the outer edge to the central opening;
- the central opening is defined by an inner edge of the electrical insulator that has a substantially circular profile such that the inner edge of the electrical insulator conforms to the shape of the high voltage conductor;
- wherein the apparatus is configured to be installed in the installed position by receiving the high voltage conductor through the conductor receiving channel such that the inner edge of the electrical insulator rests on a top of the high voltage conductor.

* * * * *